United States Patent [19]

Katoh et al.

[11] Patent Number: 4,650,298
[45] Date of Patent: Mar. 17, 1987

[54] REFLECTING MIRROR ASSEMBLY FOR AUTOCOLLIMATOR

[75] Inventors: Takashi Katoh, Toride; Yoshihisa Tanimura, Yatabemachi, both of Japan

[73] Assignees: Agency of Industrial Science & Technology; Ministry of International Trade & Industry, both of Tokyo, Japan

[21] Appl. No.: 721,778

[22] Filed: Apr. 10, 1985

[30] Foreign Application Priority Data

Apr. 17, 1984 [JP] Japan ................... 59-77321

[51] Int. Cl.$^4$ ............................................. G02B 27/30
[52] U.S. Cl. ................... 350/602; 356/138; 356/153
[58] Field of Search ........ 350/600, 602, 626, 631–633, 350/639; 356/138, 140, 153; 362/269–275, 277, 280, 282, 283, 292, 296, 297, 298, 300–303, 306; 33/283, 174 C

[56] References Cited

U.S. PATENT DOCUMENTS

| | | | |
|---|---|---|---|
| 3,480,367 | 11/1969 | Husted et al. | 356/138 X |
| 4,135,823 | 1/1979 | Hörvallius | 356/153 X |
| 4,306,806 | 12/1981 | Barron | 356/153 X |
| 4,441,818 | 4/1984 | Wickman | 356/138 X |
| 4,451,148 | 5/1984 | Magee | 356/138 |

Primary Examiner—Donald Watkins
Attorney, Agent, or Firm—Oblon, Fisher, Spivak, McClelland & Maier

[57] ABSTRACT

A reflecting mirror assembly for an autocollimator comprises a partial reflecting mirror standing upright on a base and provided with an area for reflecting part of the rays of a light beam from the autocollimator and an area for transmitting the remaining rays of the light beam; a first reflecting mirror for deflecting the rays passing through the transmitting area substantially by 90°; and a second reflecting mirror which always remains vertical irrespective of any inclination of the base and which reflects the rays reflected by the first reflecting mirror. The arrangement makes it possible to simultaneously view the pitching, yawing and rolling movements of a test object on the same screen of the autocollimator.

4 Claims, 12 Drawing Figures

FIG_1
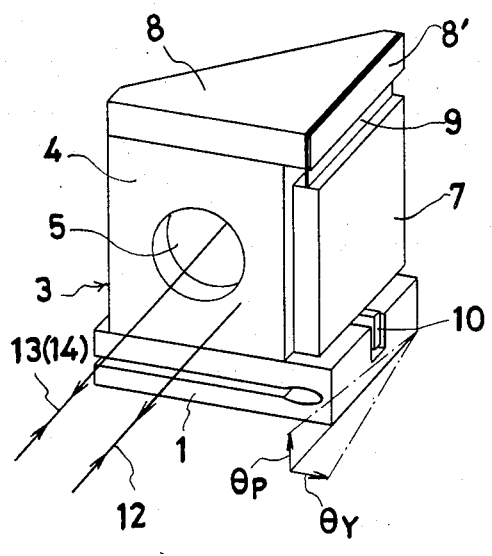
FIG_2
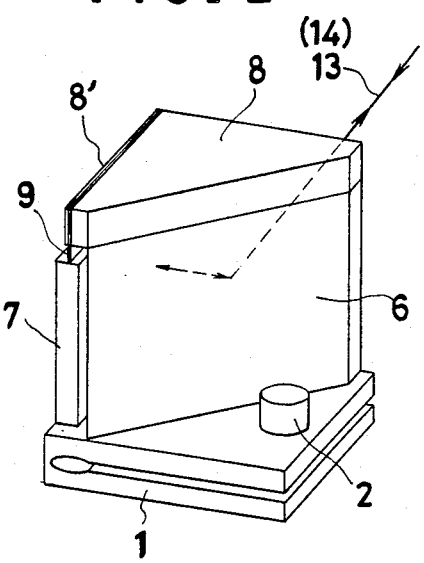
FIG_3
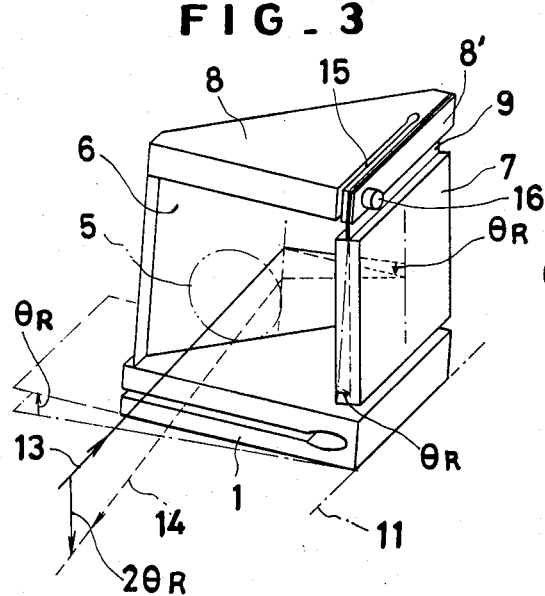
FIG_4
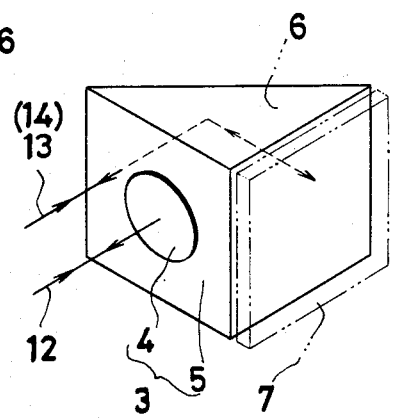

FIG. 5
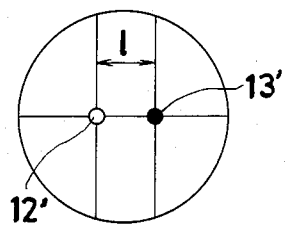
FIG. 8
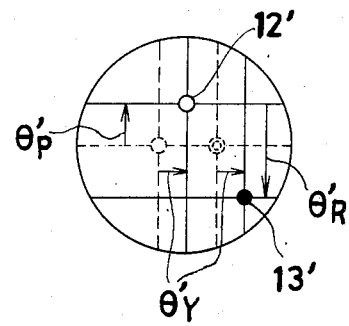
FIG. 6(a)  FIG. 6(b)  FIG. 6(c)
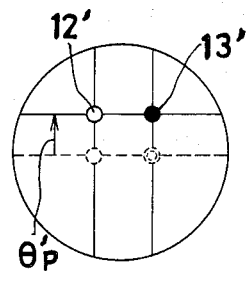 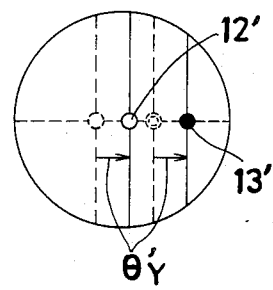 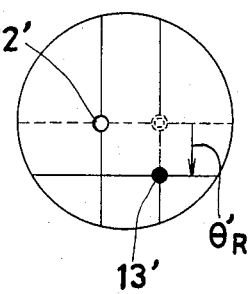
FIG. 7(a)  FIG. 7(b)  FIG. 7(c)
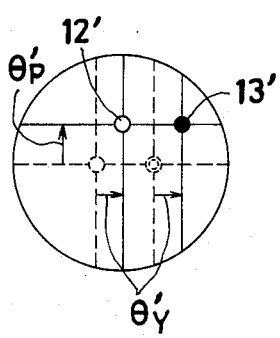 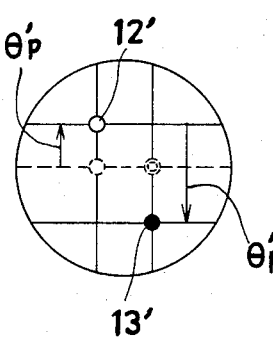 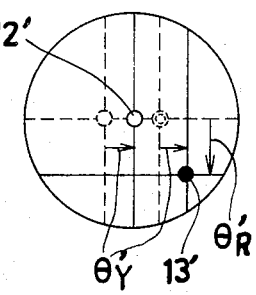

REFLECTING MIRROR ASSEMBLY FOR AUTOCOLLIMATOR

BACKGROUND OF THE INVENTION

1. Field of the Invention

The present invention relates to a reflecting mirror assembly for an autocollimator.

2. Description of the Prior Art

As is well known, a conventional autocollimator is provided with a light source, a reticle plate, a focus plate, and optical system, wherein light from the reticle plate becomes a parallel light beam directed toward a reflecting mirror placed on a test object and is reflected therefrom to the same optical system so as to form an optical image on the focus plate (screen) so that the inclination angle of the reflecting mirror is measured with high accuracy based on the position of the image. Using this principle of the autocollimator it is possible to carry out high-precision measurement of the rotational angle of a rotary disc, the minute deflection of an elastic segment, the perpendicularity of parts and the like. Where the straightness of a test object, e.g. the guide way of a machine bed, is measured, pitching and yawing movements of the test object can be measured by viewing the movements of the image positioned on the screen of the autocollimator while sliding the reflecting mirror rested on the test object, and at this time rolling movement of the test object can be separately measured using a level or a straight-edge and a microindicator, or another autocollimator and a reflecting mirror, whereby the thus measured values of pitching, yawing and rolling of the test object are used to determine the straightness of the test object.

Consequently, so as to be able to measure the straightness of the test object more easily and in a short time, it is desirable to make it possible to measure the rolling movement simultaneously with the pitching and yawing movements using the same screen of the autocollimator.

SUMMARY OF THE INVENTION

It is an object of the present invention to provide a reflecting mirror assembly for the autocollimator through which rolling movement of a test object can be simultaneously viewed together with pitching and yawing movements of the test object on a screen of the autocollimator.

The reflecting mirror assembly of the autocollimator according to the present invention comprises: a partial reflecting mirror standing on a base perpendicularly thereto which mirror is provided with a reflecting area for reflecting a light beam from the autocollimator and a transmitting area for transmitting the light beam from the autocollimator; a first reflecting mirror standing on the base perpendicularly thereto for deflecting the light beam transmitted through the partial reflecting mirror substantially by 90°; and a second reflecting mirror which remains vertical irrespective of any inclination of the base and reflects the beam deflected by the first reflecting mirror. With this arrangement both the pitching and the yawing movements can be measured by viewing the image formed on the screen of the autocollimator by the reflected beam from the reflecting area of the partial reflecting mirror in the usual manner, while the rolling movement can be measured by viewing the image formed on the same screen of the autocollimator by the reflected beam from the second reflecting mirror which always remains vertical. Therefore it is possible to measure the pitching, yawing and rolling movements simultaneously without modifying the autocollimator itself, and to measure the straightness of the test object with high accuracy in a short time.

Other objects and other features of the present invention will be hereinbelow clarified in detail with reference to the accompanying drawings.

BRIEF DESCRIPTION OF THE DRAWINGS

FIG. 1 is a perspective view of an embodiment of the reflecting mirror for the autocollimator according to the present invention;

FIG. 2 is a perspective rear view of the reflecting mirror shown in FIG. 1;

FIG. 3 is a perspective view of the reflecting mirror, showing the optical path of the light beam caused by the rolling movement of the test object, according to the present invention;

FIG. 4 is a perspective view of an embodiment of a right-angled prism employed as the reflecting mirrors of the present invention;

FIG. 5 is a view of the screen of the autocollimator, in which two optical images are shown as origins;

FIG. 6(a) is a view showing the movements of the two images relative to the origins when pitching movement occurs;

FIG. 6(b) is a view showing the movements of the two images relative to the origins when yawing movement occurs;

FIG. 6(c) is a view showing the movement of the two images relative to the origins when rolling movement occurs;

FIG. 7(a) is a view showing the movements of the two images relative to the origins when both pitching and yawing movements occur simultaneously;

FIG. 7(b) is a view showing the movements of the two images relative to the origins when both pitching and rolling movements occur simultaneously;

FIG. 7(c) is a view showing the movements of the two images relative to the origins when both yawing and rolling movements occur simultaneously; and FIG. 8 is a view showing the movements of the two images relative to the origins when pitching, yawing and rolling movements occur simultaneously.

DESCRIPTION OF THE PREFERRED EMBODIMENT

In FIGS. 1 and 2, the reference numeral 1 designates a base which has no backlash and has a knob 2 to finely adjust the angle thereof. On the base 1, adjacent to the front face thereof is vertically fixed a partial reflecting mirror 3 having a reflecting area 4 and a transmitting area 5. A first reflecting mirror 6 is vertically fixed to the base 1 behind the partial reflecting mirror 3 so as to form an angle of 45° between itself and the partial reflecting mirror 3. As a result, a light beam passing through the transmitting area 5 of the partial reflecting mirror 3 will be deflected by 90° by the first reflecting mirror 6. On the upper ends of the partial reflecting mirror 3 and the first reflecting mirror 6, is mounted a triangular plate 8. A second reflecting mirror 7 is suspended through a suspension member 9 fixed at an end face 8' of the triangular plate 8 and is arranged substantially at right angles relative to the partial reflecting mirror 3. The suspension member 9 is constructed of a thin leaf spring made of a suitable material with high buckling resistance, good elasticity and excellent bendability. As such materials, there can be mentioned phosphor bronze and stainless steel. Therefore the second reflecting mirror 7 is able to remain vertical at all times even when the base 1 inclines. A conventional type of damper means 10 can be provided on this second reflecting mirror 7 if necessary so that any swing movement produced in the second reflecting mirror 7 may rapidly be damped and eliminated.

It is possible to form the partial reflecting mirror 3 and the first reflecting mirror 6 integrally as a right-angled prism as shown in FIG. 4. In the embodiment of FIG. 4, a reflecting film shown by a circle is provided as the reflecting area 4 on one of the 90° intersecting surfaces of the right-angled prism. The size of the reflecting area 4 is so determined that the two images focused on the screen of the autocollimator are substantially the same in contrast. It is possible to obtain a sharp image by providing an anti-reflecting film on the surface of the transmitting area 5 of the partial reflecting mirror 3.

In the construction shown in FIGS. 1 and 2, when the base 1 is horizontal, a ray 12 constituting part of the light beam from the autocollimator (not shown) and falling incident upon the reflecting area 4 of the partial reflecting mirror 3 is reflected therefrom to return along the same optical path as that of the incident ray 12. On the other hand, a ray 13 passing through the transmitting area 5 of the partial reflecting mirror 3 is deflected by 90° by the first reflecting mirror 6 to fall incident on the second reflecting mirror 7. As the second reflecting mirror 7 is always vertical, the reflected ray 14 passes along the same optical path as that of the incident ray 13 and forms an image on the screen of the autocollimator at the same position as that of the image formed by the ray 12. If the images are formed by the two reflected rays on the screen of the autocollimator at the same position in the actual measurement, as described above, they cannot be distinguished from each other. For this reason, as shown in FIG. 3, for example, the triangular plate 8 is constructed such that a slit 15 is formed therein along the end face 8' and that a knob 16 is formed on the end face 8' at a position capable of finely adjusting the width of the slit 15 when it is rotated. By rotating the knob 16 to slightly incline the second reflecting mirror 7, thereby varying the angle of the ray 13 incident on the second reflecting mirror 7, the reflected ray 14 forms an image on the screen of the autocollimator at a position offset laterally from the position of the image formed on the same screen by the reflected ray of the incident ray 12. As a result, the two images can be easily distinguished from each other. In FIG. 1, the reference character $\theta_P$ designates the direction in which the pitching movement occurs, while $\theta_Y$ designates the direction in which the yawing movement occurs.

When the rolling movement occurs to tilt the base 1 by an angle of $\theta_R$ around an axis 11 as shown in FIG. 3, the first reflecting mirror 6 is slightly tilted downward, so that the reflected ray from the first reflecting mirror 6 fall incident on the second reflecting mirror 7 by an angle of $\theta_R$. The ray reflected from the reflecting mirror 7 is turned back toward the first reflecting mirror 6 so as to fall incident on the same, and is thereafter reflected as a reflected ray 14 which deviates from the incident ray 13 by an angle of $2\theta_R$. Namely, when the rolling movement occurs, an optical image appears on the screen at a position longitudinally shifted by an amount proportional to the rolling movement. The amount of shift is measured with the same scale as those of the shifts caused by the pitching and the yawing movements.

FIGS. 5 to 8 show the conditions of the images formed on the screen of the autocollimator. The image 12' formed by the ray 12 reflected from the partial reflecting mirror 3 and the image formed by the ray 14 reflected from the second and first reflecting mirrors 7 and 6 can be moved to a central portion of the screen by adjusting the knob 2 on the base 1 and/or the position of the autocollimator, and the two images are spaced apart from each other by a given distance $l$ as shown in FIG. 5 by rotating the knob 16 on the end face 8' of the triangular plate 8 to make it easy to distinguish the images 12', 13' from each other. The positions of the images 12', 13' in this reference condition of the base 1 are set as origins.

With respect to this reference condition of the base 1, when pitching movement occurs in the base 1 to the extent of an angle $\theta_P$, the images 12', 13' are longitudinally moved by a distance $\theta'_P$ corresponding to the angle $\theta_P$ relative to the origins indicated in broken lines in FIG. 6(a). When yawing movement occurs in the base 1 to the extent of an angle $\theta_Y$, the images 12', 13' are laterally moved by a distance $\theta'_Y$ corresponding to the angle $\theta_Y$ relative to the origins as shown in FIG. 6(b). When the rolling movement occurs in the base 1 to the extent of an angle $\theta_R$ as shown in FIG. 3, the position of the image 13' formed by the reflected ray 14 is longitudinally moved by a distance $\theta'_R$ corresponding to the angle $\theta_R$ as shown in FIG. 6(c), though the position of the image 12' formed by the reflected ray 12 is not moved.

When both the pitching and yawing movements occur simultaneously in the base 1 to the extent of angles $\theta_P$, $\theta_Y$, both the images 12', 13' formed on the screen are moved longitudinally by a distance $\theta'_P$ and laterally by a distance $\theta'_Y$ relative to the origins as shown in FIG. 7(a). When both the pitching and rolling movements occur simultaneously in the base 1, both the images 12', 13' are longitudinally moved by distances $\theta'_P$, $\theta'_R$ respectively as shown in FIG. 7(b). The amount of movement of the image 12' relative to the origins, formed by the reflected ray 12, indicates the angle of the pitching movement. The total of the amount of movement of the image 12' and the amount of movement of the image 13' relative to the origins, formed by the reflected ray 14, indicates the angle of the rolling movement. When both the yawing and rolling movements occur simultaneously in the base 1, the amount ($\theta'_Y$) of the respective lateral movements of the images 12', 13' indicates the angle of the yawing movement, and the amount ($\theta'_R$) of longitudinal movement of the image 13' indicates the angle of the rolling movement as shown in FIG. 7(c).

When the pitching, yawing and rolling movements occur simultaneously in the base 1, both the images 12', 13' are moved longitudinally respectively by distances $\theta'_P$, $\theta'_R$ and also moved laterally by a distance $\theta'_Y$ as shown in FIG. 8. In this case, the amount of longitudinal movement of the image 12' indicates the angle of the pitching movement; the amount of the respective lateral movements of the images 12', 13' indicates the angle of the yawing movement; and the total of the longitudinal movements of the images 12', 13' indicates the angle of the rolling movement.

As is clear from the above detailed description, by the use of the reflecting mirror assembly of the present invention it is possible to simultaneously view the rolling movement in addition to the pitching and the yawing movements on the same screen of the autocollimator, whereby it is possible to measure the straightness of the test object in scale and with high accuracy.

Obviously, many modifications and variations of the present invention are possible in light of the above teachings. It is therefore to be understood that within the scope of the appended claims, the present invention may be practiced otherwise than as specifically described herein.

What is claimed is:

1. A reflecting mirror assembly for an autocollimator comprising:
   a base;
   a partial reflecting mirror standing upright on said base and provided with an area for reflecting part of the rays of a light beam from said autocollimator and an area for transmitting the remaining rays of said light beam;
   a first reflecting mirror standing upright on said base for reflecting the rays of said light beam passing through said partial reflecting mirror substantially by 90°;
   a second reflecting mirror mounted to said assembly for rotation about a single axis for reflectng the rays reflected by said first reflecting mirror; and
   means for supporting said second reflecting mirror in a state of being vertically suspended at all times irrespective of any inclination of said base.

2. The reflecting mirror assembly as set forth in claim 1, wherein said base is provided with means for fine angular adjustment.

3. The reflecting mirror assembly as set forth in claim 1, wherein said second reflecting mirror is provided with a damping means.

4. The reflecting mirror assembly as set forth in claim 1, further comprising means for finely adjusting the angle formed between said partial reflecting mirror and said second reflecting mirror.

* * * * *